United States Patent Office 3,016,780
Patented Jan. 16, 1962

3,016,780
CANT ACCUMULATOR FOR PAPER CONVERTING MACHINES
Donald W. Mosen, Anaheim, Calif., assignor to Crown Zellerbach Corporation, San Francisco, Calif., a corporation of Nevada
Filed Nov. 28, 1958, Ser. No. 776,948
5 Claims. (Cl. 83—417)

This invention relates to a device for accumulating so-called cants or small rolls of paper after they leave a rewinder where they are formed and as they approach a cutoff saw where they are cut into usable lengths.

In the manufacture of rolled paper products, such for example as toilet tissue, paper toweling and other commodities, one method includes the use of a rewinder which takes paper from a large or jumbo roll and rewinds it on cores as long as the full length of the jumbo roll. These long cores with the paper wound upon them, referred to as cants in the paper industry, are fed to a cant saw where they are cut to length. In theory, the rewinder and cant saw should be operated in synchronism and so timed that the first feeds cants to the latter for continuous uninterrupted operation. However, in practice, it is necessary to stop the rewinder periodically for loading a new jumbo roll and due to the fragile nature of tissue and other papers not infrequent shutdown periods are required for both machines. If it is required to stop the saw either because of its breakdown or failure of wrapping machinery toward which the product is fed from the saw, it has heretofore been necessary to stop the rewinder because of the lack of space and handling means for its accumulating output of cants. On the other hand if the rewinder is shut down for reloading or other servicing, the saw is temporarily starved for cants and an idle period ensues which reduces the production rate of the combined machines.

It is an object of the present invention to provide an accumulator for cants between a rewinder and cutoff saw capable of receiving a large number of cants in a relatively small floor space area.

It is also an object of the invention to provide mechanism wherein cants discharged from a rewinder are delivered selectively either toward the cant saw or into the accumulator depending upon whether there is an existing supply in readiness to feed the saw.

Another object of the invention is to provide an accumulator in the form of a vertically disposed elevating mechanism adapted to receive and elevate cants for temporary storage and capable of reverse operation to lower the stored cants and feed them toward the saw when they are required.

Further objects and advantages of the invention and the manner in which it is carried into practice are made apparent in the following specification wherein reference is made to the accompanying drawings.

Figure 1:
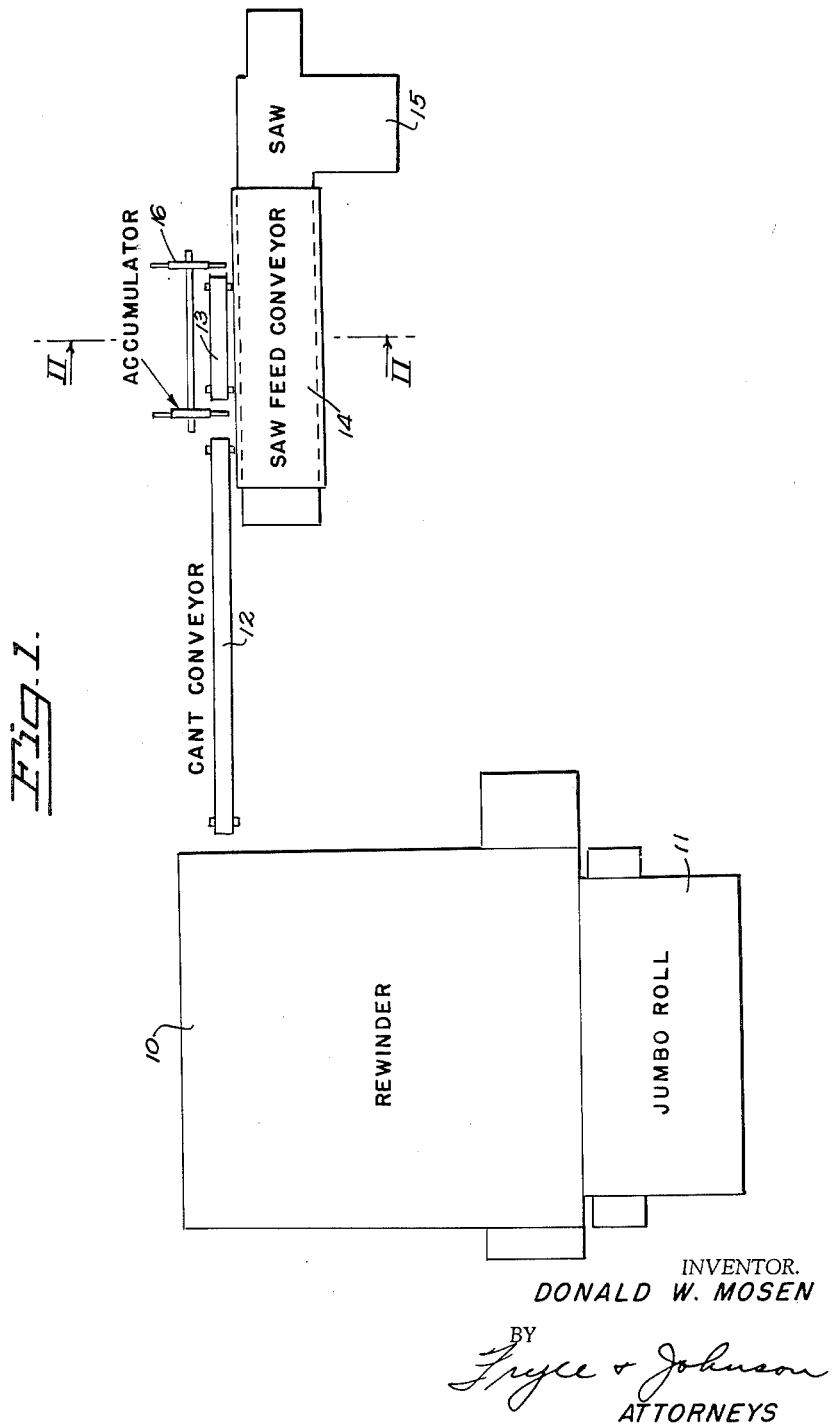
FIG. 1 is a schematic plan view illustrating the relative positions of a rewinder cant saw and the accumulator of the present invention.

Referring first to FIG. 1 of the drawings, a rewinder is shown at 10, the function of which is to take paper from a jumbo roll indicated at 11 and transfer it to cores upon which it is wound in small rolls referred to in the industry as cants. In production, for instance of toilet tissue, the cants may be approximately 90" long and 4" or more in diameter and are delivered away from the rewinder by conveyors, the positions of which are indicated in FIG. 1 at 12 and 13. Cants overlying conveyor 13 are transferred to a saw feed conveyor generally indicated at 14 by which they are advanced a step at a time toward a saw 15, the function of which is to cut the long rolls or cants into usable length, usually 4½". As the short rolls leave the saw, they are advanced toward wrapping and packaging machinery which does not form a part of the present invention. The invention is, in fact, directed specifically to an accumulator generally indicated at 16, the function of which is to accumulate and store cants at any time that the rewinder is producing more than the saw can accummodate and also to feed these stored cants into the saw when the operation of the rewinder has been interrupted for any reason.

Figure 2:
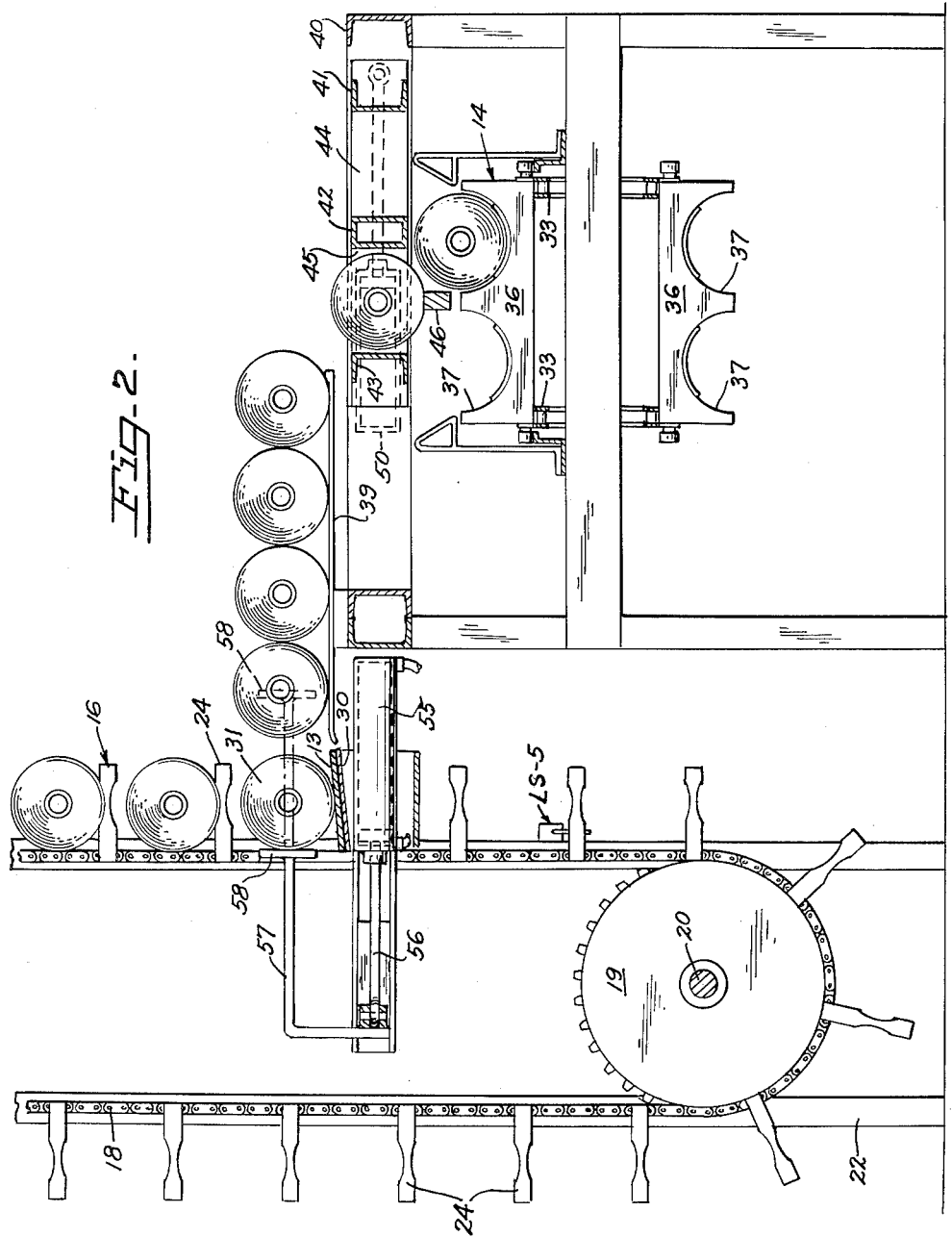
FIG. 2 is a sectional view taken on the line II—II of FIG. 1.
Figure 3:
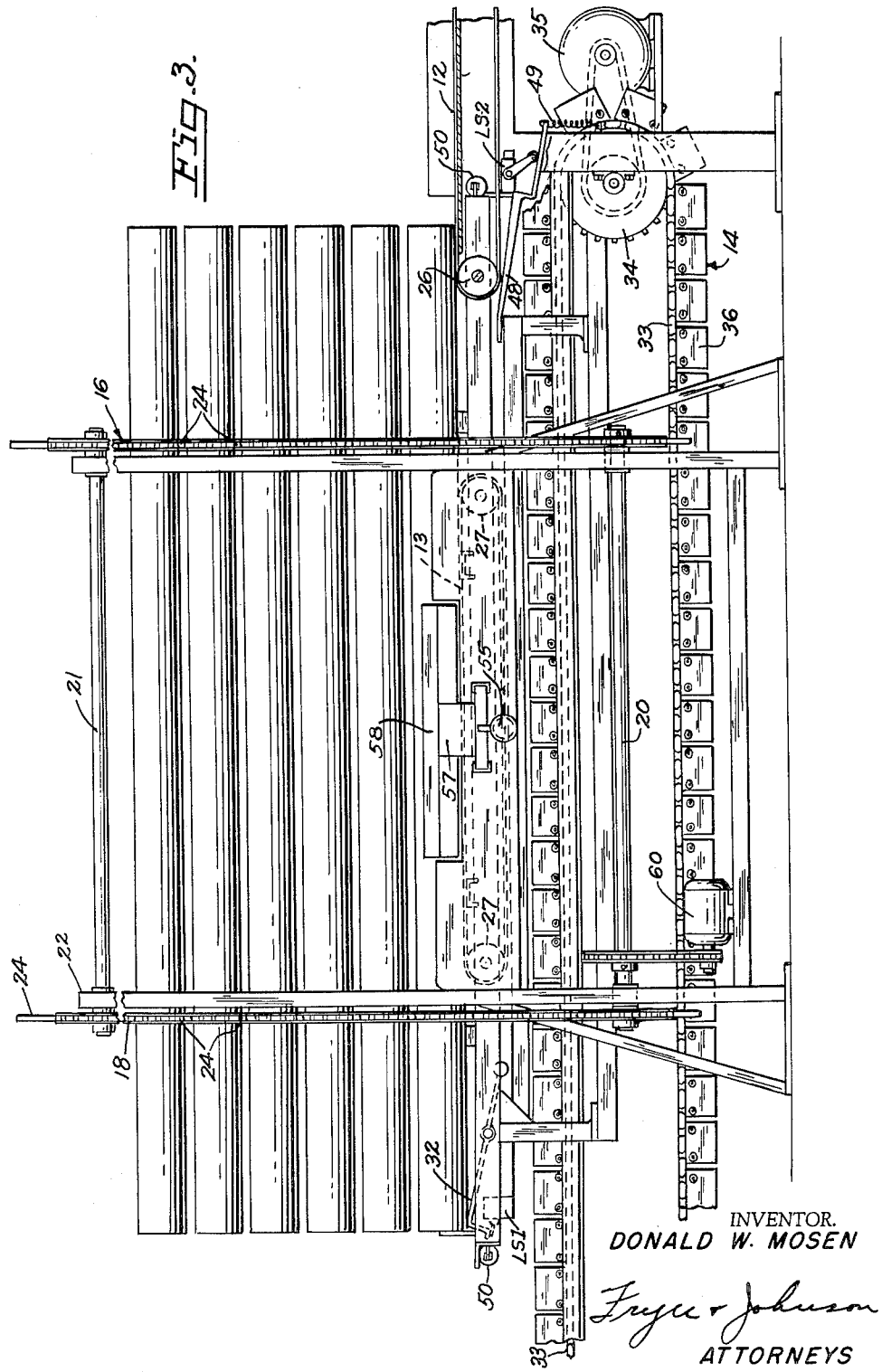
FIG. 3 is a fragmentary view in rear elevation illustrating the cant accumulator of the present invention and also showing portions of the saw feed conveyor.
Figure 4:
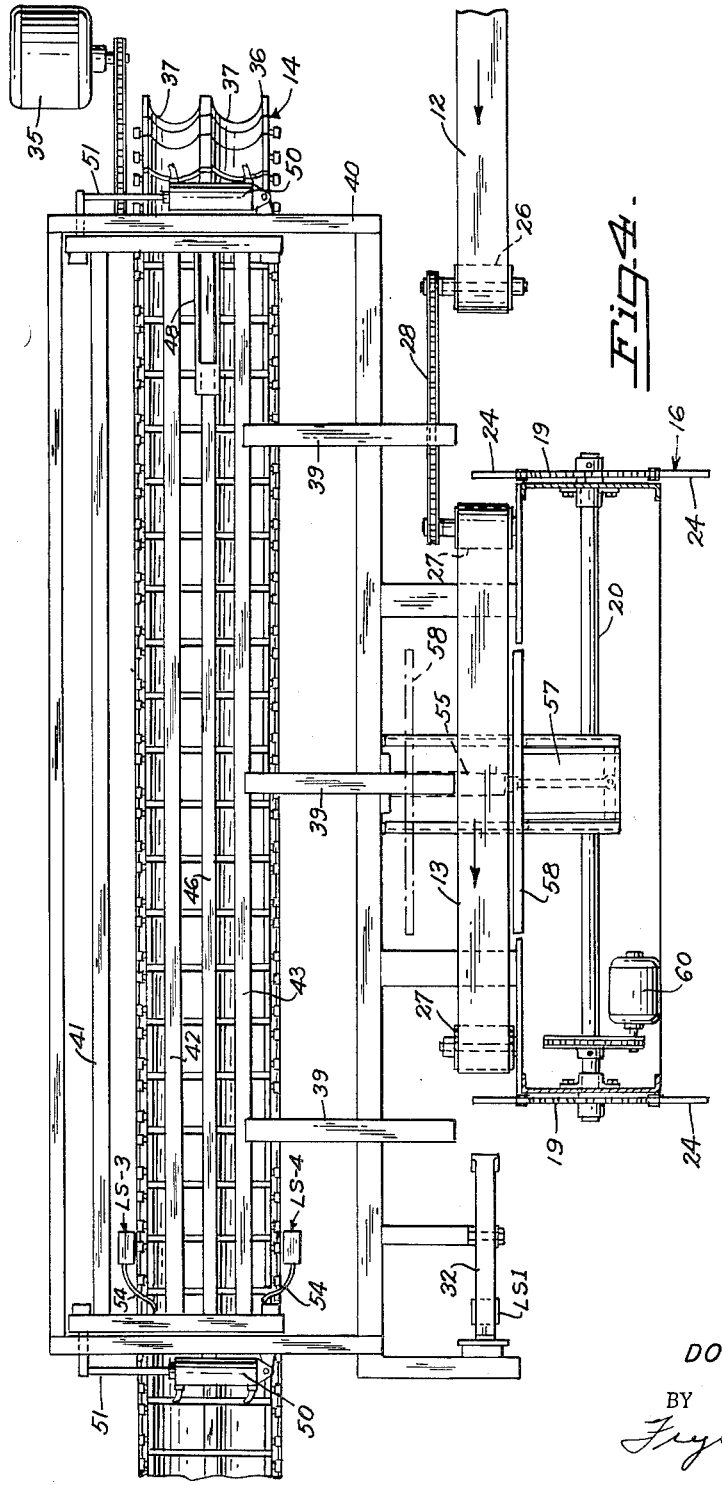
FIG. 4 is a plan view of the mechanism illustrated in FIG. 3.

Referring now to FIGS. 2, 3 and 4, the cant accumulator generally indicated at 16 comprises a pair of endless chains 18 driven by lower sprockets 19 on a shaft 20 and identical upper sprockets on a shaft 21 best shown in FIG. 3 all supported on an upstanding frame work indicated at 22. Each of the chains 18 has a plurality of fingers 24 which project outwardly in horizontal planes or normal to the vertical reaches of the chains. The fingers 24 are arranged in pairs, one of each pair being carried on each chain at a common level to provide a horizontal support for a cant. The normal at rest position of the chains 18 is such that a cant being discharged from the rewinder on the conveyors 12 and 13 will enter above one pair of the fingers 24 to come to rest thereon. The conveyors 12 and 13 are simple flat belts operating on the same level, as illustrated in FIG. 3, and trained over rollers such as indicated at 26 and 27 which, as illustrated in FIG. 4, are connected for movement in the same direction and at the same speed by sprockets and a chain illustrated at 28. The conveyor 12 originates at the rewinder and is driven by a motor at the rewinder which is not shown and the drive to the conveyor 13 is imparted through the chain 28 so that both conveyors may be started or stopped simultaneously. As shown in FIG. 2, the top flight of the conveyor 13 which is disposed between two of the fingers 24 on the accumulator rides over a supporting plate 30 which is inclined slightly inwardly toward the accumulator to prevent accidental rolling of the cant away from the accumulator.

The conveyors 12 and 13 are normally in motion but when a cant is delivered into the accumulator in the transfer position thereon, which is illustrated at 31 in FIGS. 2 and 3, its leading end contacts an actuating lever 32 of a limit switch LS-1 breaking the circuit to the motor which drives the conveyors 12 and 13 so that the conveyor comes to rest with the cant in the position either to be raised by the accumulator or to be advanced toward the saw feed conveyor.

The saw feed conveyor illustrated in FIGS. 2, 3 and 4 is of conventional construction being a portion, for purposes of illustration, of a Gilbertville cant saw, though saws of other manufacture can be used in combination with the accumulator of the present invention. The saw feed conveyor comprises chains 33 driven by sprockets, one of which is illustrated at 34 in FIG. 3, the power being supplied as by a motor 35. The chains carry blocks 36, each block having two concave recesses 37 forming two parallel grooves for the reception of cants. The blocks are separated endwise from each other sufficiently to provide space for the blade of a cant saw which passes between them as they are advanced step by step.

The cants, a few of which are disposed on supporting bars 39 between the accumulator and the saw feed conveyor are delivered alternately, first to one row of recesses 37 in the blocks 36 and then to the other. In accordance with the present invention, this alternate feed is accomplished by a selector frame slidably supported in the top frame 40 of the saw feed mechanism and comprising, as best shown in FIGS. 2 and 4, three spaced bars 41, 42 and 43 forming two cant receiving open pockets 44 and 45 either one or the other of which in the normal rest position is centered over a support bar 46. As shown in FIG. 2, a cant has been delivered to the right hand side of the saw feed conveyor and another cant is disposed in the pocket 45 in readiness for delivery to the left hand conveyor upon movement of the selector frame toward the left. The presence of a cant in the pocket 45 indicates that the saw is being supplied with a continuous supply of cants and its presence is registered by actuation of a switch LS–2, see FIG. 3. The pivoted actuating arm 48 of this switch overlies the support bar 46 and is normally held upwardly by a spring 49. It is only in the absence of a cant on the support bar 46 that the saw is said to be calling for cants and a cant will be sent toward the saw from the accumulator in the manner presently to be described in detail. Thus, the slidable selector frame including its open pockets 44 and 45 cooperable with support bar 46 comprise cant detecting means positioned between the cant saw and accumulator 16.

Shifting of the selector frame with its cant receiving pockets 44 and 45 from one position to the other is accomplished by a pair of pneumatic cylinders 50, the piston rods 51 of which are connected to the selector frame. The flow of air under pressure to the opposite ends of the cylinders 50 is controlled by limit switches LS–3 and LS–4 shown in FIG. 4 with actuating fingers 54 extending into the path of cants in the two sides of the saw feed conveyor. As the cant on either side passes into the saw, the finger 54 on that side slides off of the tail end of the cant to actuate the corresponding switch.

If the saw is calling for cants when a cant moves into the position 31 of FIG. 2, the supply of cants on the bars 39 is moved outwardly so that the outermost thereof is deposited in either of the pockets 44 or 45. This is accomplished by a pneumatic cylinder 55, the piston rod 56 of which extends rearwardly and carries an upwardly and forwardly directed bracket 57 which in turn carries a pusher plate 58 at its forward end. Actuation of the pneumatic cylinder 55 which is also controlled by a solenoid valve therefore effects feeding of the cant to the saw conveyor.

On the other hand if the saw is not calling for cants which is evidenced by the presence of a cant in one of the pockets 44 or 45, the delivery of the cant to the position 31 in FIG. 2 effects energization of a motor 60 shown in FIG. 3 to elevate the accumulator one step or a distance corresponding to the vertical space between two pairs of its fingers 24. The circuit to the motor 60 is broken by a switch LS–5 in FIG. 2 actuated by vertical movement of the fingers 24. The position of the switch LS–5 may, of course, be varied as it could as well be actuated by spaced projections on one of the elevator sprockets or sprocket shafts. This elevating or storing of cants on the accumulator continues step by step so long as the saw is not calling for cants. This may take place for an extended period of time in the event of a break down of the saw or of wrapping machinery beyond the saw which necessitates it being shut down. The cants can be stored on the fingers 24 on both sides of the accumulator as, upon its continued upward motion, the cants pass over the upper end thereof and start progressing downwardly on the back side and the number of cants so accumulated is limited only by the height of the accumulator, the storage of as many as 65 cants having been found entirely practical.

In the event of a shutdown of the rewinder which may occur either to replace a depleted jumbo roll or because of a breakdown of the mechanism, the rewinder operator can throw a reversing switch to effect operation of the motor 60 in the opposite direction for bringing a cant into the position 31 of FIG. 2. Downward movement of this cant also actuates switch LS–1, which has two sets of contacts, temporarily to stop the downward motion of the accumulator and the cant will either remain in position 31 or be advanced toward the saw feed conveyor depending upon whether the saw is calling for cants.

Figure 5:
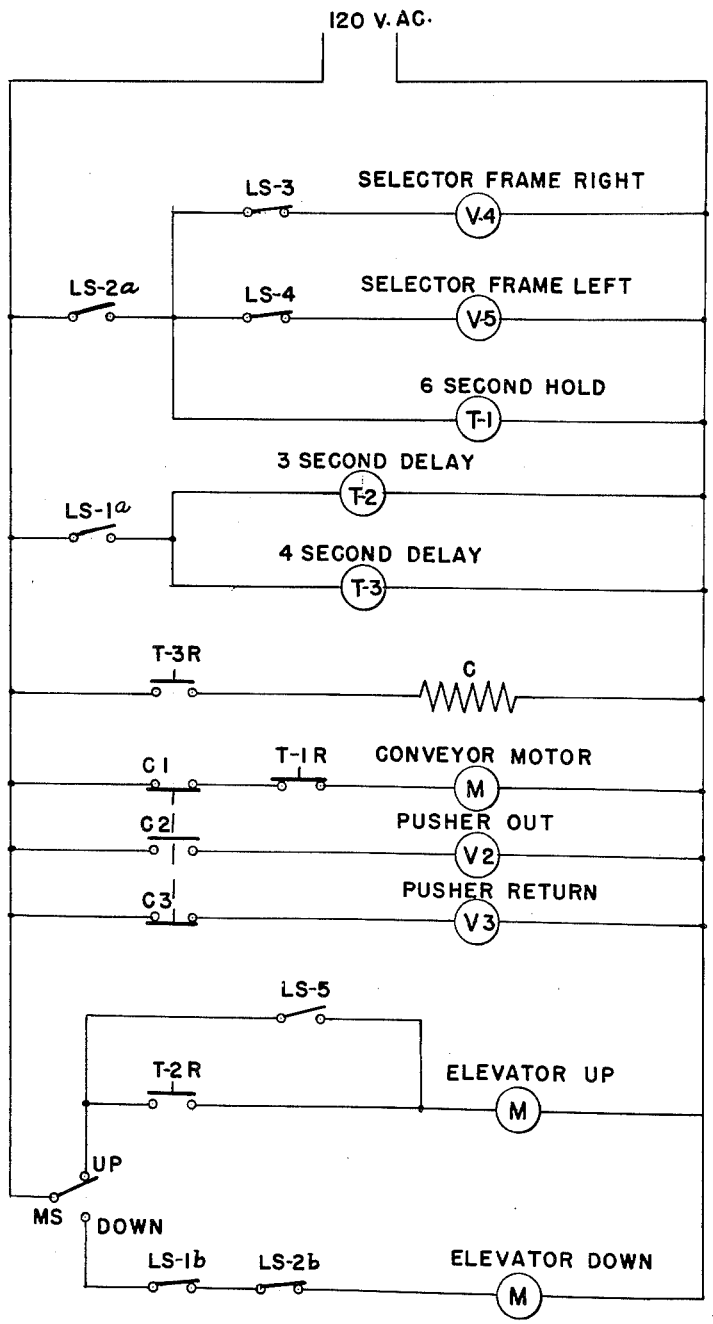
FIG. 5 is an elementary wiring diagram showing the circuits for controlling the mechanisms illustrated in FIGS. 1 to 4, inclusive.

FIG. 5 is a schematic electric and pneumatic circuit diagram in which the operation previously described takes place as follows. When a cant from the rewinder moves into the accumulator, it closes the normally open contact LS–1a of the limit switch LS–1 closing the circuit to two timing switches T–2 and T–3 which control relay switches T–2R and T–3R, respectively, and function to close the circuits to their respective relays and hold it closed for a limited period of time. For example, T–2 may hold the circuit closed approximately three seconds while T–3 may hold it closed approximately four seconds. Assuming that the saw is calling for cants, the normally opened contact LS–2a of limit switch LS–2 will be open and a timer T–1 will not be energized. Energization of timer T–3 will, however, have closed relay switch T–3R energizing coil C which actuates a three-contact switch, opening contact C–1 to break the circuit to and stop the motor which drives conveyor 12–13. It also closes contact C–2 to actuate the solenoid valve V–2 which controls the pneumatic cylinder to effect a delivery stroke of the pusher 58. Contact C–3 is also simultaneously opened to open solenoid valve V–3 permitting exhaust of air from the opposite end of the pneumatic cylinder. Since timer T–3 closes the circuit for only four seconds, contacts C–1, C–2 and C–3 will again assume their normal position shown so that the conveyor will start and the pusher will be returned to its normal position.

When a cant moves into the accumulator when the saw is not calling for cants and the LS–2a contact is, therefore, closed because of the presence of a cant on the support bar 46 over the saw feed conveyor, a circuit is completed through timer T–1 which functions to immediately close the circuit and hold it closed for a period somewhat longer than the time delay timers T–2 and T–3, for example about six seconds. During this limited period, T–1 is completing a circuit to normally closed relay T–1R, opening T–1R and breaking the circuit to the pneumatic solenoid valve V–2 controls the pusher 58 so that the cant is not fed to the saw. However, the closing of T–3R relay switch has again effected opening of C–1 to stop the conveyor 12—13, the closing of C–2 and opening of C–3 of course being ineffectual. Meanwhile, LS–1a having been closed by the presence of a cant in the accumulator starts the operation of timer T–2 so that at the expiration of three seconds, the relay T–2R which it controls completes the circuit to the accumulator elevator motor 60 to start the accumulator elevator in its upward direction. This is a holding circuit which includes switch LS–5 which is closed when the circuit is completed and which is opened when the accumulator has moved upwardly one station as previously described.

When the rewinder is not operating and cants previously loaded into the accumulator are required for continued operation of the saw, the manually actuated switch MS, positioned to be controlled by the rewinder operator, is thrown to its down position completing a circuit which is the reverse circuit of the elevator motor 60 so that the motor is energized to move the elevator downwardly until a cant stored in the elevator strikes switch LS–1 opening normally closed contacts LS–1b thereon to stop the elevator motor and closing contact LS–1a to effect feeding of a cant to the saw in the manner previously described. However, in the event that a cant is present on the support bar 46 over the saw feed conveyor, normally closed contact LS–2b would be open breaking the circuit to the elevator motor until such time as the saw is again calling for a cant.

The diagram also shows switches LS–3 and LS–4 controlling solenoid switches V–4 and V–5 which actuate the pneumatic cylinders for the selector frame as previously described.

I claim:

1. For combination with a rewinder for producing paper cants, a cant saw, means for conveying a succession of cants between the rewinder and the saw, a movable accumulator having a plurality of spaced apart cant supporting means, each being disposable in a position to receive a cant on the conveying means, cant detecting means between the cant saw and said position, means automatically controlled by said cant detecting means to eject cants from said position to said saw when said detecting means indicates the absence of a cant, and means automatically operable to move the cant accumulator in one direction with a cant on a cant supporting means to store cants on said accumulator when said detecting means indicates the presence of a cant.

2. For combination with a rewinder for producing paper cants, a cant saw, means for conveying a succession of cants between the rewinder and the saw, a movable accumulator having a plurality of spaced apart cant supporting means, each being disposable in a position to receive a cant on the conveying means, cant detecting means between the cant saw and said position, means automatically controlled by said cant detecting means to eject cants from said position to said saw when said detecting means indicates the absence of a cant, means automatically operable to move the cant accumulator in one direction with a cant on a cant supporting means to store cants on said accumulator when said detecting means indicates the presence of a cant, and selectively operable control means for moving the accumulator in an opposite direction to feed cants to the saw when the rewinder is not supply cants.

3. The apparatus of claim 2 wherein said accumulator comprises a substantially vertically positioned endless conveyor and the cant supporting means thereon comprises a plurality of pairs of generally horizontally projecting spaced apart cant supporting fingers, said pairs of fingers being spaced apart along the length of said accumulator conveyor to register successively with said conveying means for said succession of cants, and means is provided to actuate said accumulator with cants thereon one step at a time to storage positions.

4. For combination with a rewinder for producing paper cants, a cant saw, means for conveying a succession of cants between the rewinder and the saw including an endless saw feed conveyor having parallel grooves; a movable accumulator having a plurality of spaced apart cant supporting means, each being disposable in a position to receive a cant on the conveying means; cant detecting means over the saw feed conveyor between the cant saw and said position including a bar for supporting a cant above and between said saw feed conveyor grooves, and a frame with a pair of open pockets mounted for back and forth movement for alternate positioning of said pockets over the support bar to allow cants on the bar to fall into one or other of the saw feed conveyor grooves; means automatically controlled by said cant detecting means to eject cants from said position to said saw when said detecting means indicates the absence of a cant; and means automatically operable to move the cant accumulator in one direction with a cant on a cant supporting means to store cants on said accumulator when said detecting means indicates the presence of a cant.

5. The apparatus of claim 4 wherein means is provided effective upon advancement of a cant into the saw from either one of said saw feed conveyor grooves for controlling movement of said movable frame.

References Cited in the file of this patent

UNITED STATES PATENTS

| | | |
|---|---|---|
| 1,282,379 | Christensen | Oct. 22, 1918 |
| 2,671,552 | Miller | Mar. 9, 1954 |
| 2,700,448 | Ames | Jan. 25, 1955 |
| 2,873,020 | Kay | Feb. 10, 1959 |